Figure 1:
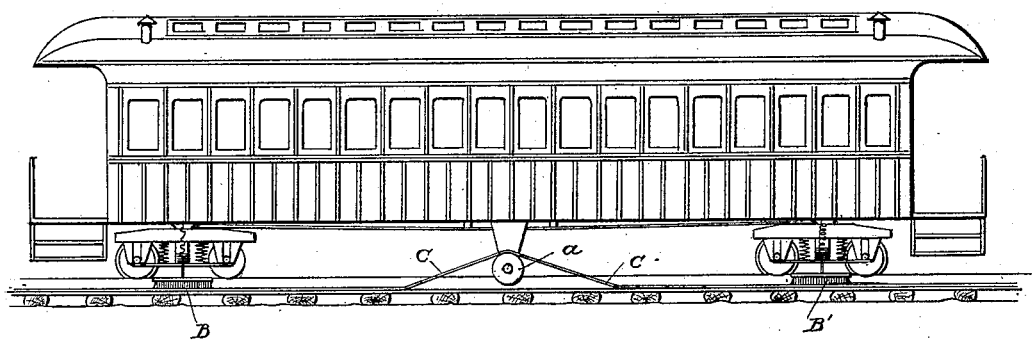

(No Model.)

B. CADE.
RAILWAY TELEGRAPHY.

No. 397,049. Patented Jan. 29, 1889.

Witnesses:
N. W. Mortimer
R. W. Elliott

Inventor:
Baylus Cade,
by R. S. Dyrenforth,
his Attorney.

United States Patent Office.

BAYLUS CADE, OF LOUISBURG, NORTH CAROLINA.

RAILWAY-TELEGRAPHY.

SPECIFICATION forming part of Letters Patent No. 397,049, dated January 29, 1889.

Application filed March 6, 1888. Serial No. 266,377. (No model.)

*To all whom it may concern:*

Be it known that I, BAYLUS CADE, a citizen of the United States, residing at Louisburg, in the county of Franklin and State of North Carolina, have invented certain new and useful Improvements in Railway-Telegraphs; and I do hereby declare the following to be a full, clear, and exact description of the invention, such as will enable others skilled in the art to which it appertains to make and use the same.

This invention relates to telegraphy.

The object is to provide simple and effective means whereby telegraphic communication may be established between moving trains and the stations along their tracks, or elsewhere.

The invention consists in a conductor of electricity comprising permanent magnets and pieces of attractable metal—such as soft iron—placed in contact and suitably insulated.

Furthermore, the invention consists in a conductor of electricity comprising permanent magnets and pieces of attractable material placed alternately and in contact with each other and an insulating band or belt inclosing the same, and to which they are suitably fastened.

Furthermore, the invention consists in a conductor of electricity composed of permanent magnets and pieces of attractable metal—such as soft iron—alternately placed and in contact with each other, and a suitable band or covering of insulating material in which said pieces are inclosed, each piece being secured at or near its center to the upper portion of the insulating band or belt by means of a rivet or other fastening exposed above the surface of the insulation.

Furthermore, the invention consists, in combination with a car or other movable body carrying an idle-wheel, cam, or projection, of a conductor of electricity composed of permanent magnets and pieces of soft iron arranged alternately and in contact with each other, and an insulating band or belt inclosing said pieces, the conductor passing above said idle-wheel or similar device, for the purpose of breaking the contact between the pieces of metal within the band.

Furthermore, the invention consists, in combination with a car or other movable body, of metal brushes carried by said car or movable body and an idle-wheel or projection, also carried by said car and placed between said brushes, a conductor of electricity, composed of alternately-arranged permanent magnets and pieces of soft iron placed in contact with each other, and an insulating-covering in which said pieces are inclosed, each piece being secured therein by a conductible metal fastening exposed above the surface of the insulation, said conductor being so placed that its metal fastenings will be in continual contact with the brushes carried by the car, the conductor passing above the idle-wheel, cam, or projection, in order to break the contact between the magnets and pieces of soft iron.

Furthermore, the invention consists in various novel details of construction hereinafter fully set forth.

In the accompanying drawings like letters of reference indicate corresponding parts in all the figures, in which—

Figure 2:
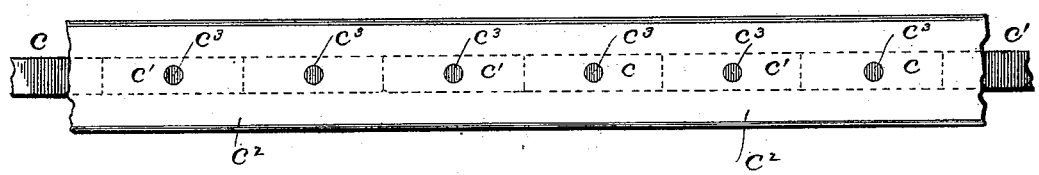
Figure 3:
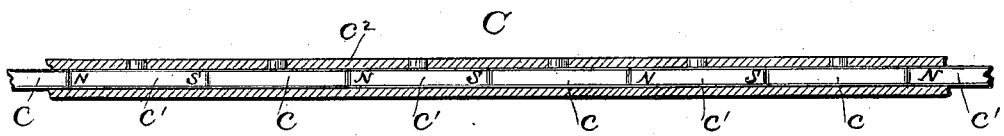
Figure 4:
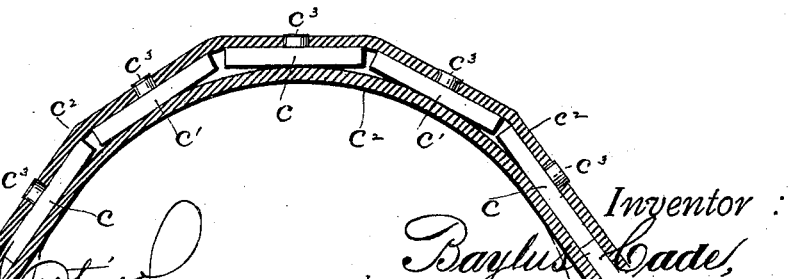

Figure 1 represents a car in side elevation, the metallic brushes being in contact with the electrical conductor, the conductor passing above an idle-wheel depending from the car between the metallic brushes. Fig. 2 represents a plan view of a portion of the electrical conductor alone, showing in dotted lines the pieces of soft iron and permanent magnets in contact with each other, and also showing the metallic fastenings exposed above the surface of the insulating-band. Fig. 3 represents a vertical longitudinal sectional view of a portion of the electrical conductor alone, showing the insulating band or belting, the pieces of soft iron, and the permanent magnets in contact with each other, and also the metallic fastenings projecting through the upper layer of insulating material. Fig. 4 represents a vertical sectional view of a portion of the conductor passing above the idle-wheel, cam, or projection, in order to break the contact between the pieces of metal.

A designates a car of ordinary construction, upon opposite ends of which, preferably to the trucks, are secured metallic brushes B B', depending therefrom, being insulated from the car and connected with an ordinary telegraph-instrument placed within the car. A conductor of electricity, C, is laid along the road-bed beside the track in such position that its upper surface will be in continual contact with the brushes B B'. This conductor is formed of a series of permanent magnets, N S c, and pieces of attractable metal, c', alternately arranged within a covering, c², of rubber belting or other suitable insulating material. To the upper face of this covering the magnets and pieces of attractable metal are secured, preferably by rivets c³, each piece being fastened at or near its center to permit its ends to have free movement when the position of the conductor is disturbed.

Depending from the car at a point between the brushes is provided an idle-wheel, cam, or projection, a, over which the conductor C passes. When the conductor is raised by this idle-wheel during motion of the car, the magnets and pieces of attractable metal at this point within the conductor are separated from each other, as shown in Fig. 4, thus breaking the circuit. As soon as that portion of the belt is permitted to assume its normal position the pieces of metal are again brought in contact, this being insured by the attraction between the magnets and the attractable metal, the elasticity of the belt allowing the metal to be in continuous contact, notwithstanding the fact that the pieces are riveted to the belt. The metallic brushes being in contact with the upper face of the conductor, they are consequently at all times in direct contact with one or more of the metallic fastenings exposed thereon, and the circuit in the conductor being broken between the brushes by the dislocation of the metallic pieces the current of electricity conveyed by the conductor is caused to pass through the car by means of the connection between the brushes. Thus a continuous line is provided from one end of the track to the other, the car being at all times, whether at rest or in motion, directly within the circuit, the circuit of the line being broken at no place except beneath the car or at the point of raising the conductor above the idle-wheel.

Having thus fully described my invention, what I claim as new, and desire to secure by Letters Patent, is—

1. A conductor of electricity, comprising permanent magnets and pieces of attractable metal placed alternately and in contact with each other and suitably insulated, substantially as set forth.

2. In a conductor of electricity, the combination of permanent magnets and pieces of attractable metal placed alternately and in contact with each other and an insulating band or covering inclosing the same, and to which they are suitably fastened, substantially as shown and described.

3. In a conductor of electricity, the combination of permanent magnets and pieces of attractable metal placed in contact with each other, a suitable inclosing band or covering of insulating material, and rivets or other suitable conductible fastenings securing said magnets and attractable metal to the upper portion of the covering, and being exposed above the top of the same, substantially as shown and described.

4. In combination with a car or other movable body carrying an idle-wheel, or described equivalent, a sectional conductor of electricity insulated and resting upon said idle-wheel or the like, whereby movement of the car or movable body will cause the conductor to be raised at that point and its continuity to be broken, substantially as and for the purpose set forth.

5. The combination, with a car or other movable body, of metallic brushes depending therefrom and electrically connected with each other through the car, an idle-wheel, cam, or the like carried by the car between the brushes, and electrical conductor composed of permanent magnets, attractable material placed alternately and in connection with each other, an insulating-covering and conductible fastenings securing said magnets and attractable material to the insulation and extending above the same, all arranged substantially as and for the purpose set forth.

In testimony whereof I affix my signature in presence of two witnesses.

BAYLUS CADE.

Witnesses:
R. G. DYRENFORTH,
R. M. ELLIOTT.